(12) United States Patent
Hamilton et al.

(10) Patent No.: US 11,113,214 B2
(45) Date of Patent: Sep. 7, 2021

(54) CONTROLLING DATA TRANSFERS BETWEEN A TIER OF PERSISTENT DATA STORAGE AND PROCESSOR MEMORY WITH A HIGH-SPEED FABRIC CONTROLLER

(71) Applicant: LENOVO Enterprise Solutions (Singapore) PTE. LTD., New Tech Park (SG)

(72) Inventors: Jeffrey R. Hamilton, Pittsboro, NC (US); Sumanta K. Bahali, Cary, NC (US); Peter R. Seidel, Cary, NC (US); Brian E. Bigelow, Apex, NC (US); Juan Q. Hernandez, Garner, NC (US)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 82 days.

(21) Appl. No.: 16/550,004

(22) Filed: Aug. 23, 2019

(65) Prior Publication Data
US 2021/0056055 A1 Feb. 25, 2021

(51) Int. Cl.
*G06F 13/16* (2006.01)
*G06F 13/36* (2006.01)
*G06F 3/06* (2006.01)

(52) U.S. Cl.
CPC ........ *G06F 13/1673* (2013.01); *G06F 3/0613* (2013.01); *G06F 3/0659* (2013.01); *G06F 3/0673* (2013.01); *G06F 13/36* (2013.01)

(58) Field of Classification Search
CPC .. G06F 13/1673; G06F 3/0673; G06F 3/0659; G06F 13/36; G06F 3/0613; G06F 3/0685; G06F 3/0649; G06F 3/061

USPC ................ 711/154, 111, 4; 710/305, 300, 36
See application file for complete search history.

(56) References Cited

U.S. PATENT DOCUMENTS

| 2002/0023190 A1* | 2/2002 | Peng | G06F 13/1626 710/308 |
| 2015/0067091 A1* | 3/2015 | Das | G06F 13/28 709/213 |
| 2017/0052738 A1* | 2/2017 | Shimmitsu | G06F 3/0634 |
| 2018/0267902 A1* | 9/2018 | Edwards | G06F 3/0685 |

OTHER PUBLICATIONS

Intel E8501 Chipset North Bridge (NB) datasheet, Document No. 309620-001, pp. 1-388, May 2006 (Year: 2006).*

* cited by examiner

*Primary Examiner* — Hong C Kim
(74) *Attorney, Agent, or Firm* — Kunzler Bean & Adamson; Bruce R. Needham

(57) ABSTRACT

An apparatus for memory management a high-speed fabric controller and a memory controller connected between a high-speed memory and a processor. The memory controller is configured to control processor access to the high-speed memory over a memory bus between the processor and the high-speed memory. The apparatus includes a high-speed data connection between the memory controller and the high-speed fabric controller and a data connection between a tier of persistent data storage and the high-speed fabric controller. The high-speed fabric controller is configured to control data transfers between the tier of persistent data storage over and the high-speed memory independent of the processor.

19 Claims, 5 Drawing Sheets

CONTROLLING DATA TRANSFERS BETWEEN A TIER OF PERSISTENT DATA STORAGE AND PROCESSOR MEMORY WITH A HIGH-SPEED FABRIC CONTROLLER

FIELD

The subject matter disclosed herein relates to data management and more particularly relates to use of a direct connection between non-persistent/persistent memory of a processor and a high-speed fabric controller to facilitate data tiering independent of the processor.

BACKGROUND

Processors require memory to store data accessed by the processor. However, memory, whether non-persistent or persistent, is typically more expensive as speed of writing data and accessing the data increases. Typically, a processor has a fast parallel connection to non-persistent/persistent memory such as random-access memory ("RAM"), flash memory or other high-speed memory. Processors typically control caching data in the non-persistent/persistent memory as well as offloading the data to other data tiers, such as NAND flash memory, hard disk drives, tape storage, etc. Thus, typical processors expend precious resources to manage data movement between the high-speed memory and other data tiers.

BRIEF SUMMARY

An apparatus for memory management is disclosed that includes a high-speed fabric controller and a memory controller connected between a high-speed memory and a processor. The memory controller is configured to control processor access to the high-speed memory over a memory bus between the processor and the high-speed memory. The apparatus includes a high-speed data connection between the memory controller and the high-speed fabric controller and a data connection between a tier of persistent data storage and the high-speed fabric controller. The high-speed fabric controller is configured to control data transfers between the tier of persistent data storage over and the high-speed memory independent of the processor.

Another apparatus for memory management includes a high-speed fabric controller comprising a data tiering aggregator and a memory controller connected between a high-speed memory and a processor. The memory controller is configured to control processor access to the high-speed memory over a memory bus between the processor and the high-speed memory. The apparatus includes a high-speed data connection between the memory controller and the high-speed fabric controller, a data connection between a first tier of persistent data storage and the high-speed fabric controller, a data connection between each of one or more additional tiers of persistent data storage and the high-speed fabric controller, and a data connection between the processor and the high-speed fabric controller. The data tiering aggregator is configured to control data tiering between the high-speed memory, the first tier of persistent data storage and the one or more additional tiers of persistent data storage. The high-speed fabric controller is configured to control data transfers between the tier of persistent data storage over and the high-speed memory independent of the processor without the data passing through the processor.

A system for memory management includes a processor, a high-speed memory connected to the processor over a memory bus, a high-speed fabric controller and a memory controller connected between the high-speed memory and the processor. The memory controller is configured to control processor access to the high-speed memory over the memory bus. The system includes a high-speed data connection between the memory controller and the high-speed fabric controller, and a data connection between each of one or more tiers of persistent data storage and the high-speed fabric controller. The high-speed fabric controller is configured to control data transfers between the one or more tiers of persistent data storage over and the high-speed memory independent of the processor.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
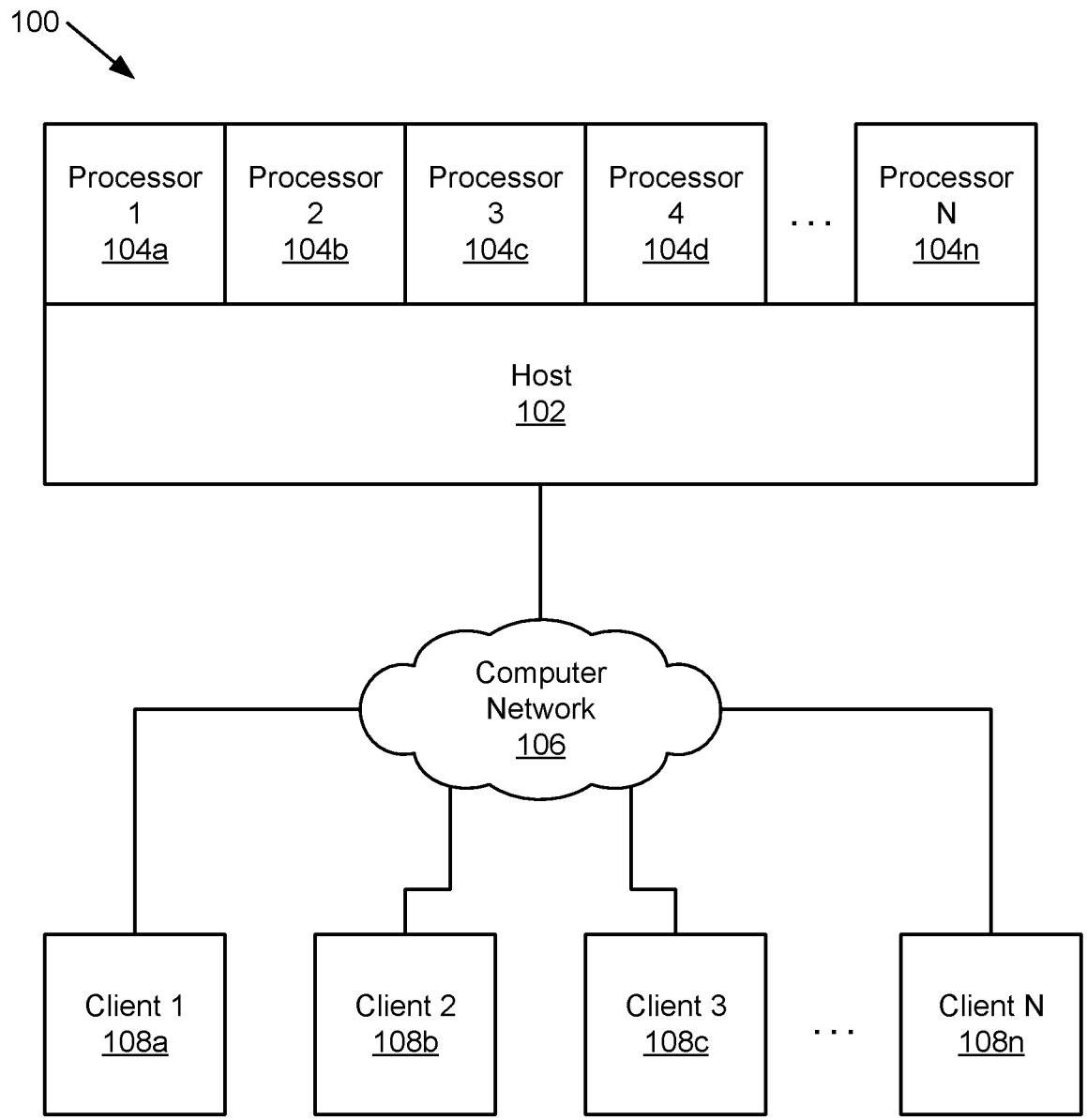
FIG. 1 is a schematic block diagram illustrating one embodiment of a system for memory management.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

An apparatus for memory management is disclosed. An alternate apparatus and a system also perform the functions of the apparatus. The apparatus for memory management includes a high-speed fabric controller and a memory controller connected between a high-speed memory and a processor. The memory controller is configured to control processor access to the high-speed memory over a memory bus between the processor and the high-speed memory. The apparatus includes a high-speed data connection between the memory controller and the high-speed fabric controller and a data connection between a tier of persistent data storage and the high-speed fabric controller. The high-speed fabric controller is configured to control data transfers between the tier of persistent data storage over and the high-speed memory independent of the processor.

In some embodiments, the high-speed fabric controller transfers data between the high-speed memory and the tier of persistent data storage without the data passing through the processor. In other embodiments, the apparatus includes a data connection between the processor and the high-speed fabric controller. In other embodiments, the high-speed fabric controller is configured to control data transfers between the tier of persistent data storage over and the high-speed memory over the high-speed data connection.

In some embodiments, the high-speed data connection is a first high-speed data connection, the processor is a first processor, the memory controller is a first memory controller and the high-speed memory is a first high-speed memory and the apparatus includes a second high-speed data connection between the high-speed fabric controller and a second memory controller connected between to a second high-speed memory and a second processor. The second memory controller is configured to control second processor access to the second high-speed memory over a memory bus between the second processor and the second high-speed memory and the high-speed fabric controller is configured to control data transfers between the first high-speed memory, the tier of persistent data storage and/or the second high-speed memory independent of the first processor and the second processor. In other embodiments, the high-speed fabric controller is configured to manage spare data capacity of the first high-speed memory and the second high-speed memory to share spare data capacity so that spare data capacity of the first high-speed memory and the second high-speed memory is less than spare data capacities of not sharing spare data capacity.

In some embodiments, the tier of persistent data storage is a first tier of persistent data storage and the apparatus includes one or more additional tiers of persistent data storage and the high-speed fabric controller further includes a data tiering aggregator that is configured to control data tiering between the high-speed memory, the first tier of persistent data storage and the one or more additional tiers of persistent data storage. In other embodiments, the data tiering aggregator is configured to manage data tiering independent of caching instructions from the processor. In other embodiments, the processor includes a pre-fetch queue and requests data caching through the pre-fetch queue and the data tiering aggregator accesses the pre-fetch queue to fulfil caching requests from the processor. In other embodiments, the first tier of persistent data storage and the one or more additional tiers of persistent data storage are connected to the high-speed fabric controller over a high-speed data connection. In other embodiments, the high-speed memory and each tier of persistent data storage have a different data storage speed and the data tiering aggregator is configured to manage data tiering based on data storage speeds of the high-speed memory and each tier of persistent data storage. In other embodiments, the data tiering aggregator is configured to present data to the processor as a single data source without respect to a data tier of data storage controlled by the high-speed fabric controller.

In some embodiments, data connections between the memory controller, the high-speed memory and the processor comprise a parallel memory interface. In other embodiments, the memory controller is configured to respond to commands from the processor and the high-speed fabric controller. As used herein, a data connection may be referred to as being between two components when the data connection connects to both of the two components and provides data communication therebetween.

Another apparatus for memory management includes a high-speed fabric controller comprising a data tiering aggregator and a memory controller connected between a high-speed memory and a processor. The memory controller is configured to control processor access to the high-speed memory over a memory bus between the processor and the high-speed memory. The apparatus includes a high-speed data connection between the memory controller and the high-speed fabric controller, a data connection between a first tier of persistent data storage and the high-speed fabric controller, a data connection between each of one or more additional tiers of persistent data storage and the high-speed fabric controller, and a data connection between the processor and the high-speed fabric controller. The data tiering aggregator is configured to control data tiering between the high-speed memory, the first tier of persistent data storage and the one or more additional tiers of persistent data storage. The high-speed fabric controller is configured to control data transfers between the tier of persistent data storage over and the high-speed memory independent of the processor without the data passing through the processor.

In some embodiments, the data tiering aggregator is configured to manage data tiering independent of caching instructions from the processor. In other embodiments, the high-speed memory and each tier of persistent data storage have a different data storage speed and the data tiering aggregator is configured to manage data tiering based on data storage speeds of the high-speed memory and each tier of persistent data storage. In other embodiments, the data tiering aggregator is configured to present data to the processor as a single data source without respect to a data tier of data storage controlled by the high-speed fabric controller.

A system for memory management includes a processor, a high-speed memory connected to the processor over a memory bus, a high-speed fabric controller and a memory controller connected between the high-speed memory and the processor. The memory controller is configured to control processor access to the high-speed memory over the memory bus. The system includes a high-speed data connection between the memory controller and the high-speed fabric controller, and a data connection between each of one or more tiers of persistent data storage and the high-speed fabric controller. The high-speed fabric controller is configured to control data transfers between the one or more tiers of persistent data storage over and the high-speed memory independent of the processor.

In some embodiments, the high-speed data connection is a first high-speed data connection, the processor is a first processor, the memory controller is a first memory controller and the high-speed memory is a first high-speed memory. The system includes a second processor, a second high-speed memory, a second high-speed data connection between the high-speed fabric controller and a second memory controller connected between the second high-speed memory and the second processor. The second memory controller is configured to control second processor access to the second high-speed memory over a memory bus between the second processor and the second high-speed memory. The high-speed fabric controller is configured to control data transfers between the first high-speed memory, the one or more tiers of persistent data storage and/or the second high-speed memory independent of the first processor and the second processor.

FIG. 1 is a schematic block diagram illustrating one embodiment of a system 100 for memory management. The system 100 includes a host 102 with several processors 104a-n (generically or combined "104"), a computer network 106 and several clients 108a-n (generically or combined "108"), which are explained below.

The system 100 includes a host 102 connected to one or more processors 104. The host 102 includes hardware and facilitates access to the processors 104. For example, the host 102 may include network adapters for connection to clients 108 or other components over the computer network 106. The host 102, in some embodiments, includes a hypervisor which is configured to manage virtualization where one or more logical partitions ("LPARs") are created to run on one or more processors 104. For example, a hypervisor creates an LPAR based on needs of an entity communicating through a client (e.g. client 1 108a) where the LPAR includes an instance of an operating system running on one or more processors 104. The hypervisor, in the example, allocates resources to the LPAR, such as processor capacity, memory, etc.

In one embodiment, the host 102 and processors 104 are part of a rack mounted system including a backplane, servers, storage devices, power supplies, and the like. In another embodiment, the host 102 and processors 104 are part of a mainframe computer. In other embodiments, the host 102 and processors 104 are in a data center, part of a cloud system, etc. One of skill in the art will recognize other form of a host 102 and processors 104 for memory management.

The system 100 includes a computer network 106, which may be a wired network, an optical network, a wireless connection, etc. and may include a combination of network types. The computer network 106 may include cabling, switches, routers, servers, and the like. The computer network 106 may include a local area network ("LAN"), a wide area network ("WAN"), a wireless LAN ("WLAN"), a metropolitan area network ("MAN"), a storage area network ("SAN"), the internet, etc. or any combination thereof.

The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA" ®). Alternatively, the wireless connection may be a cellular telephone network communication. All standards and/or connection types include the latest version and revision of the standard and/or connection type as of the filing date of this application.

The system 100 includes one or more clients 108 that access the host 102. For example, a client 108 may submit workloads, may run software applications, may access data, etc. over the computer network 106. A client 108 may be a workstation, a terminal, a desktop computer, a laptop computer, a smartphone or any other computing device capable of accessing and using computing resources on the host 102 and processors 104.

Figure 2:
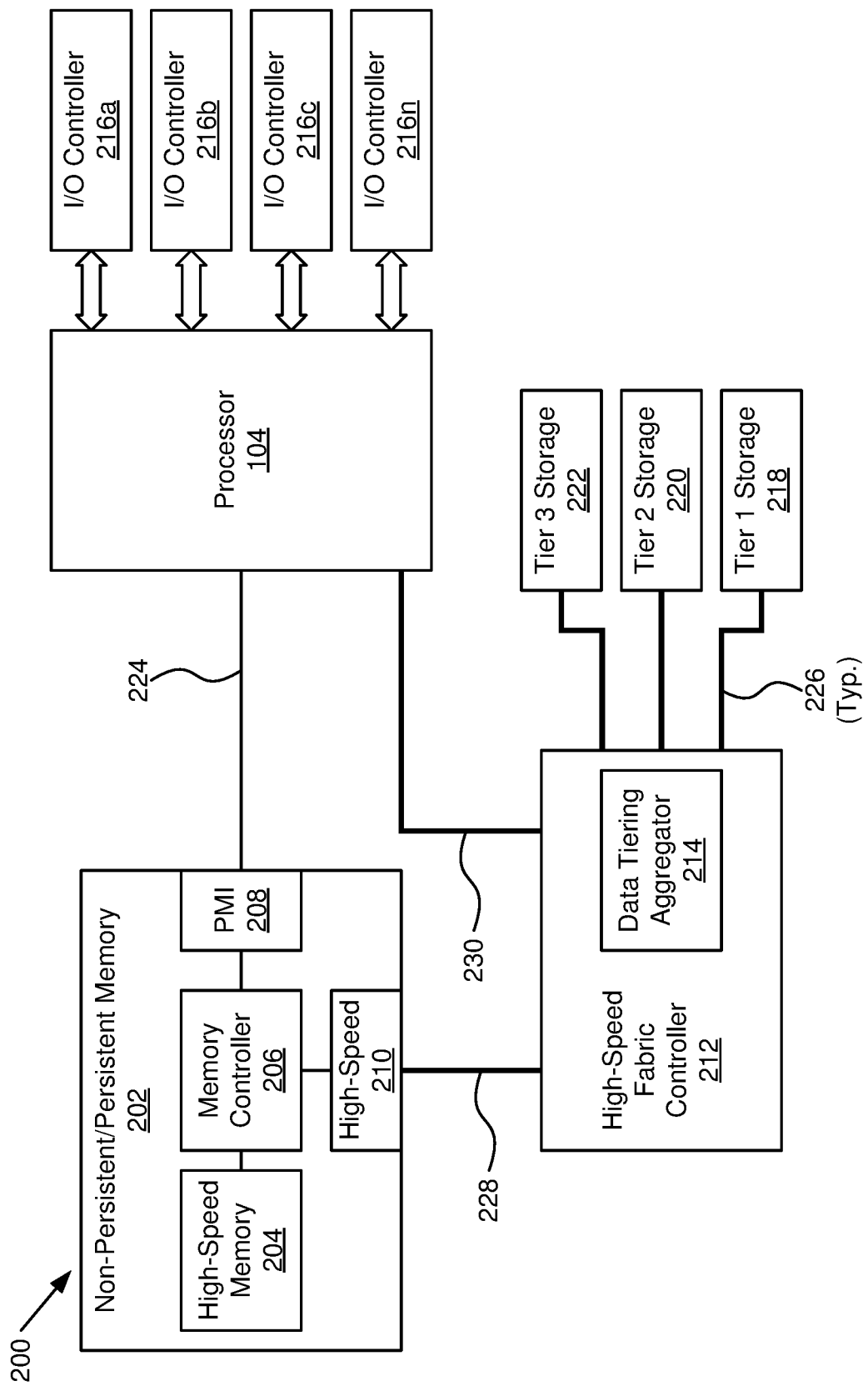
FIG. 2 is a schematic block diagram illustrating one embodiment of an apparatus for memory management.

FIG. 2 is a schematic block diagram illustrating one embodiment of an apparatus 200 for memory management. The apparatus 200 includes a processor 104, non-persistent/persistent memory 202 with high-speed memory 204, a memory controller 206, a parallel memory interface ("PMI") 208, a high-speed bus interface 210, a high-speed fabric controller 212, a data tiering aggregator 214, input/output ("I/O") controllers 216a-n, tier 1 storage 218, tier 2 storage 220, and tier 3 storage 222, which are described below. In some embodiments, the parallel memory interface 208 may include one or more serial interfaces, such as Serializer/Deserializer ("SerDes") interfaces.

The apparatus 200 includes a processor 104, which may include any of the processors 104 of the system 100 of FIG. 1. The processor 104 includes a connection to a non-persistent/persistent memory 202. The non-persistent/persistent memory 202 may be random access memory ("RAM"), flash memory or other memory capable of storing and retrieving data quickly over the memory interface 208.

In typical systems, the non-persistent/persistent memory 202 typically includes RAM or flash memory and a memory controller that is configured to control access and retrieval of data requested by the processor 104. Typically, the only access to the non-persistent/persistent memory 202 is through the processor so that data that is moved to other lower level data storage devices always goes through the processor 104, which consumes cycles of the processor 104.

In the apparatus 200 of FIG. 2, the non-persistent/persistent memory 202 includes high-speed memory 204 connected through a memory controller 206 to the processor over the memory interface 208 over a memory bus 224, to the processor 104, like other conventional systems, but also includes a direct connection 228 to a high-speed fabric controller 212 through the memory controller 206 over a high-speed data connection through the high-speed bus interface 210 in addition to a processor connection 230 between the processor 104 and the high-speed fabric controller 212 over a high-speed data connection. In some embodiments, the memory bus 224 is a parallel bus. This separate connection 228 to the high-speed fabric controller 212 enables access of data in the high-speed memory 204 independent of the processor connection 230 to the processor 104, which opens up a wealth of possibilities. In some embodiments, the memory controller 206 is configured to respond to commands from the processor 104 and the high-speed fabric controller 212.

As with a conventional system, the high-speed memory 204 may be RAM, flash memory other high-speed memory technology capable of interacting with the processor 104 at a high rate. For example, the high-speed memory 204 may be in the form of a dual in-line memory module ("DIMM"), single in-line memory module ("SIMM"), or other such memory on a 32-bit bus, a 64-bit bus, a 128-bit bus, or other parallel-accessed memory. The memory controller 206 differs from conventional memory controllers in a non-persistent/persistent memory 202 in that the memory controller 206 also services requests from the high-speed fabric controller 212.

The high-speed data connections 226, 228, 226 (depicted as darker lines) may be a peripheral component interconnect ("PCI") bus, PCI express ("PCIe"), InfiniBand®, RapidIO®, HyperTransport®, Intel® QuickPath Interconnect ("QPI"), Mobile Processor Interface ("MIPI"®), or other bus protocol capable of operation in a host 102 or other computer and transporting data.

The high-speed fabric controller 212 is a memory controller capable of accessing and storing data in the high-speed memory 204 of the non-persistent/persistent memory 202 and moving the data in and out of other computer storage devices in another non-persistent/persistent memory 202 or in various tiers of persistent data storage, such as the tier 1 storage 218, the tier 2 storage 220, the tier 3 storage 222 or other data storage location in the system 100.

The tier 1 storage 218 is data storage that has lower performance characteristics than the high-speed memory 204, such as non-volatile memory express ("NVMe"), a solid-state drive ("SSD"), NAND flash memory, and the like. The tier 2 storage 220 is typically slower and typically less expensive data storage than the tier 1 storage 218. The tier 2 storage 220 may include one or more hard disk drives ("HDDs"), or other storage device slower than the tier 1 storage 218. The tier 3 storage 222 is typically the least expensive storage and may include long-term storage options, such as object storage, a tape drive, an optical drive, a large capacity SATA (serial advanced attachment) drive, and the like. In other embodiments, the tiering is divided differently. For example, tier 1 storage 218 may include HDDs. One of skill in the art will recognize other ways of tiering data.

The data tiering aggregator 214 is configured to control data tiering between the high-speed memory 204, the first tier of persistent data storage (e.g. tier 1 storage 218) and the one or more additional tiers of persistent data storage (e.g. tier 2 storage 220 and tier 3 storage 222). For example, the data tiering aggregator 214 makes caching decisions based on a data access history, data requests, and the like. The apparatus 200 provides a method whereby data may be offloaded in to a respective tier (e.g. tier 1 storage 218) directly from the high-speed memory 204 without having to traverse back through the processor 104. Thus, the high-speed fabric controller 212 transfers data between the high-speed memory 204 and a tier of persistent data storage (e.g. tier 1 storage 218) without the data passing through the processor 104. In some embodiments, the data tiering aggregator 214 is configured to manage data tiering independent of caching instructions from the processor 104. Data may then be transferred to lower tiers (e.g. tier 2 storage 220 or tier 3 storage 222) as the data becomes less useful to the processor 104 (e.g. 104a), or other processors (e.g. 104b-n) connected to a high-speed fabric and to the high-speed fabric controller 212, which may be accomplished in a variety of ways.

One example may be a data purge from the processor 104. Seeing as how a processor 104 may simply override data in the high-speed memory 204, instead of performing an override, the existing data may be deployed over the high-speed data connection 226 to the next layer of storage tier (e.g. tier 1 storage 218), or perhaps down multiple storage tiers pending on a requirement to maintain such data. This data tiering independent of the processor 104 would be particularly useful for government applications where it is imperative that data collection is maintained at all times, during all events, for any or all reasons (e.g. retrieving emails that were drafted, but never sent, etc.).

Alternatively, a staleness algorithm may be applied to data (e.g. a file, or a portion of a file). In this scenario, data would re-occurringly be monitored for activity, and in the event that the data was not re-accessed, the data tiering aggregator 214 could drop the data to a lower data tier (e.g. tier 3 storage 222). In the event of extremely I/O intensive applications, the apparatus 200 may also prove to be extremely valuable by enabling a bypass of the processor 104 such that storage data does not consume the cache and threads of the processor 104 during I/O intensive applications.

Relative to ingressing data to memory, since the data tiering aggregator 214 may be directly connected 228 to the high-speed memory 204, the processor 104 may provide a pre-fetch queue to the data tiering aggregator 214 contained within the high-speed fabric controller 212 or other convenient location. Data may then be fetched by the data tiering aggregator 214 from the pre-fetch queue and placed directly into the high-speed memory 204 such that the processor 104 can act on that data when the data becomes available. The data tiering aggregator 214 accesses the pre-fetch queue to fulfil caching requests from the processor 104. Thus, the pre-fetch queue prevents having the processor 104 to fill up one of the processor's own pipelines or busses, which would consume valuable resources that may be better utilized for alternative functions.

In some embodiments, the high-speed fabric controller 212 includes a processor. In other embodiments, the high-speed fabric controller 212 includes one or more of an FPGA, an application specific integrated circuit ("ASIC"), hardware circuits, etc. In other embodiments, the data tiering aggregator 214 includes executable code running on the high-speed fabric controller 212. In other embodiments, the data tiering aggregator 214 includes, logic, hardware circuits, a programmable hardware device, or other embodiment. One of skill in the art will recognize other ways to implement the high-speed fabric controller 212 and the data tiering aggregator 214.

In some embodiments, the high-speed fabric controller 212 is connected to the data tiers (e.g. 218, 220, 222) over a high-speed data connection 226 or other appropriate data bus. In some embodiments, the high-speed fabric controller 212 is connected 230 to the processor 104 directly over another high-speed data connection 226 or other appropriate data bus. The connection 230 between the high-speed fabric controller 212 and the processor 104 may be used to exchange data instructions, to coordinate memory management, to allow the processor 104 to access the data storage tiers (e.g. 218, 220, 222), etc.

An advantage of the data tiering aggregator 214 and high-speed fabric controller 212 is that the data tiering aggregator 214, in some embodiments, is configured to present data to the processor 104 as a single data source without respect to a data tier of data storage controlled by the high-speed fabric controller 212. This single-source data view eliminates the need of an application layer on a processor having to query multiple tiered file sources looking for a specific piece of data.

The processor 104 includes connections to one or more I/O controllers 216a-n. The I/O controllers 216a-n allow communication between the processor 104 and other devices, such as a client 108 over a network.

Figure 3:
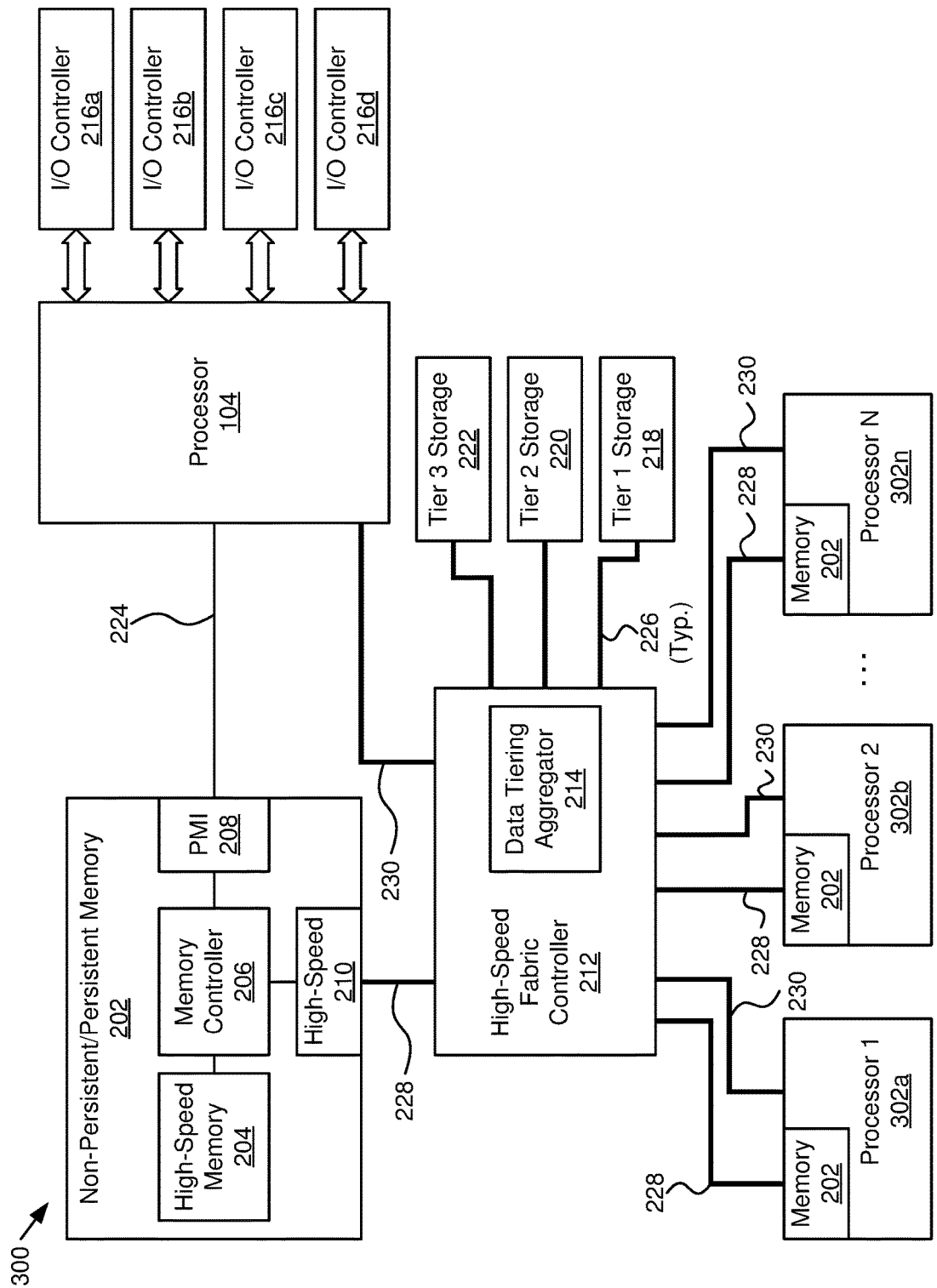
FIG. 3 is a schematic block diagram illustrating one embodiment of an apparatus for memory management with multiple processors.

FIG. 3 is a schematic block diagram illustrating one embodiment of an apparatus 300 for memory management with multiple processors 104, 302a-n. The apparatus 300 includes a processor 104, non-persistent/persistent memory 202 with high-speed memory 204, a memory controller 206, a parallel memory interface ("PMI") 208, a high-speed bus interface 210, a high-speed fabric controller 212, a data tiering aggregator 214, input/output ("I/O") controllers 216a-n, tier 1 storage 218, tier 2 storage 220, and tier 3 storage 222, which are substantially similar to those described above with respect to the apparatus 200 of FIG. 2.

The apparatus 300 is the same as the apparatus 200 of FIG. 3, but includes additional processors 302a-n. Each of the additional processors 302a-n (collectively or generically "302") may be a processor 104a-n of the system 100 of FIG. 1 and includes a non-persistent/persistent memory 202 and each non-persistent/persistent memory 202 includes a high-speed memory 204, a memory controller 206, a PMI 208 and a high-speed bus interface 210, which are substantially similar to those described above in relation to the apparatus 200 of FIG. 2. Having a connection 228 between the high-speed fabric controller 212 and non-persistent/persistent memory 202 of multiple processors 104, 302a-n opens up additional opportunities to manage data while not burdening the processors 104, 302a-n with management of the data.

In some embodiments, the data tiering aggregator 214 is configured to manage caching for the various processors 104, 302a-n independent of caching instructions from the processors 104, 302a-n. For example, a processor (e.g. 104) may determine that some data is no longer needed in the high-speed memory 204. The high-speed fabric controller 212 may determine that the data is being used by another processor (e.g. processor 1 302a) so that the high-speed fabric controller 212 is able to move the data out of the high-speed memory 204 associated with the processor 104 that no longer needs the data while maintaining the data in the high-speed memory 204 of processor 1 302a. The high-speed fabric controller 212 may move the data to the tier 1 storage 218 or another location based on information about needs of all of the processors 104, 302a-n for the data.

Typically, a single processor (e.g. 104) attempts to maintain a certain amount of spare capacity in the high-speed memory 204 of the processor 104. A typical amount of spare capacity is 25%, although a spare capacity target amount may be higher or lower. The apparatus 300 of FIG. 3 allows sharing of data capacity. In some embodiments, the high-speed fabric controller 212 is configured to manage spare data capacity of the high-speed memory 204 of the processors 104, 302a-n to share spare data capacity so that spare data capacity of the high-speed memory 204 of the processors 104, 302a-n is less than spare data capacities of not sharing spare data capacity. For example, where there are four processors (e.g. 104, 302a-c) and a desired spare capacity for a single processor 104 may be 30 percent, the high-speed fabric controller 212 may maintain a target spare capacity in each processor 104, 302a-c of 7.5 percent so that the total spare capacity of the four processors 104, 302a-c is 30 percent of the capacity of a single processor 104. One of skill in the art will recognize other amounts of spare capacity for a group of processors 104, 302a-c.

Figure 4:
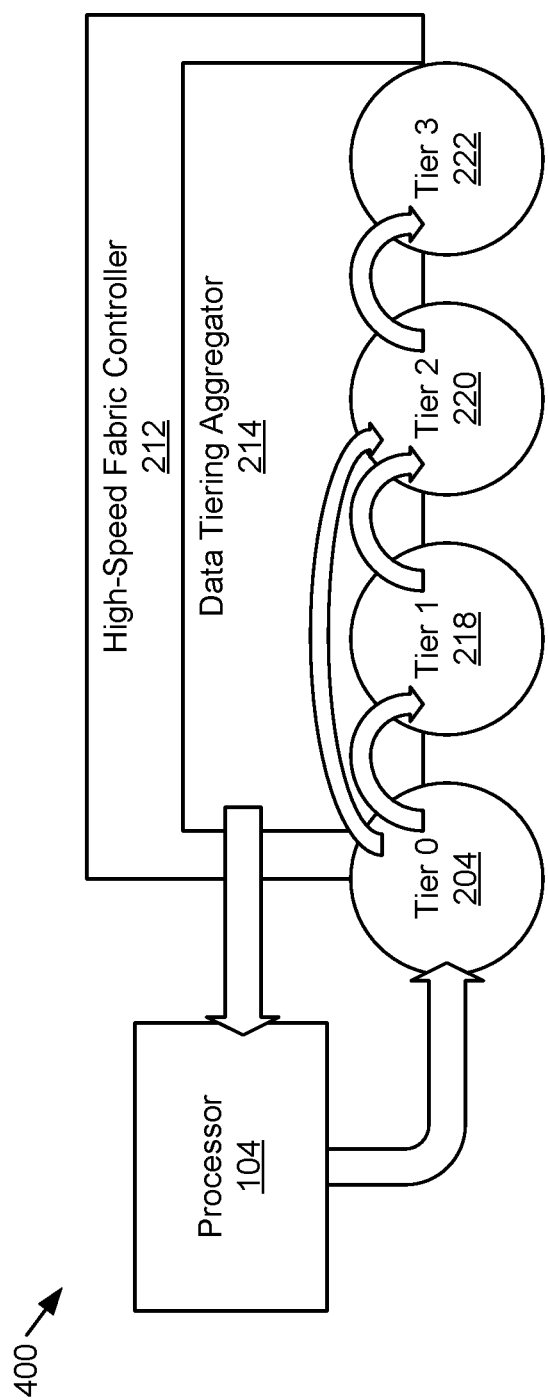
FIG. 4 is a schematic block diagram illustrating another embodiment of an apparatus for memory management.

FIG. 4 is a schematic block diagram illustrating another embodiment of an apparatus 400 for memory management. The apparatus 400 includes a processor 104, a high-speed fabric controller 212, a data tiering aggregator 214, high-speed memory 204 (labeled here as tier 0), tier 1 storage 218, tier 2 storage 220 and tier 3 storage 222, which are substantially similar to those described above in relation to the apparatuses 200, 300 of FIGS. 2 and 3.

FIG. 4 depicts various movements of data in a data tiering process under control of the data tiering aggregator 214. For example, data initially send to the processor 104 may be stored by the processor 104 in the high-speed memory 204 (e.g. tier 0 storage 204). The data tiering aggregator 214 may then move the data to tier 1 storage 218, then to tier 2 storage 220, then to tier 3 storage 222 as the data becomes stale. The data tiering aggregator 214 is not bound by movements to a next higher or next lower tier, but may also move the data to whatever tier satisfies a data tiering scheme. For example, the data tiering aggregator 214 may move data directly from tier 0 storage 204 to tier 2 storage 220. One of skill in the art will recognize ways to use the data tiering aggregator 214 to enforce a data tiering scheme. The high-speed fabric controller 212 and/or data tiering aggregator 214 enable offloading of data storage routines from the processors 104, 302a-n to the high-speed fabric controller 212 and/or data tiering aggregator 214 to free processing cycles of the processors 104, 302a-n.

Figure 5:
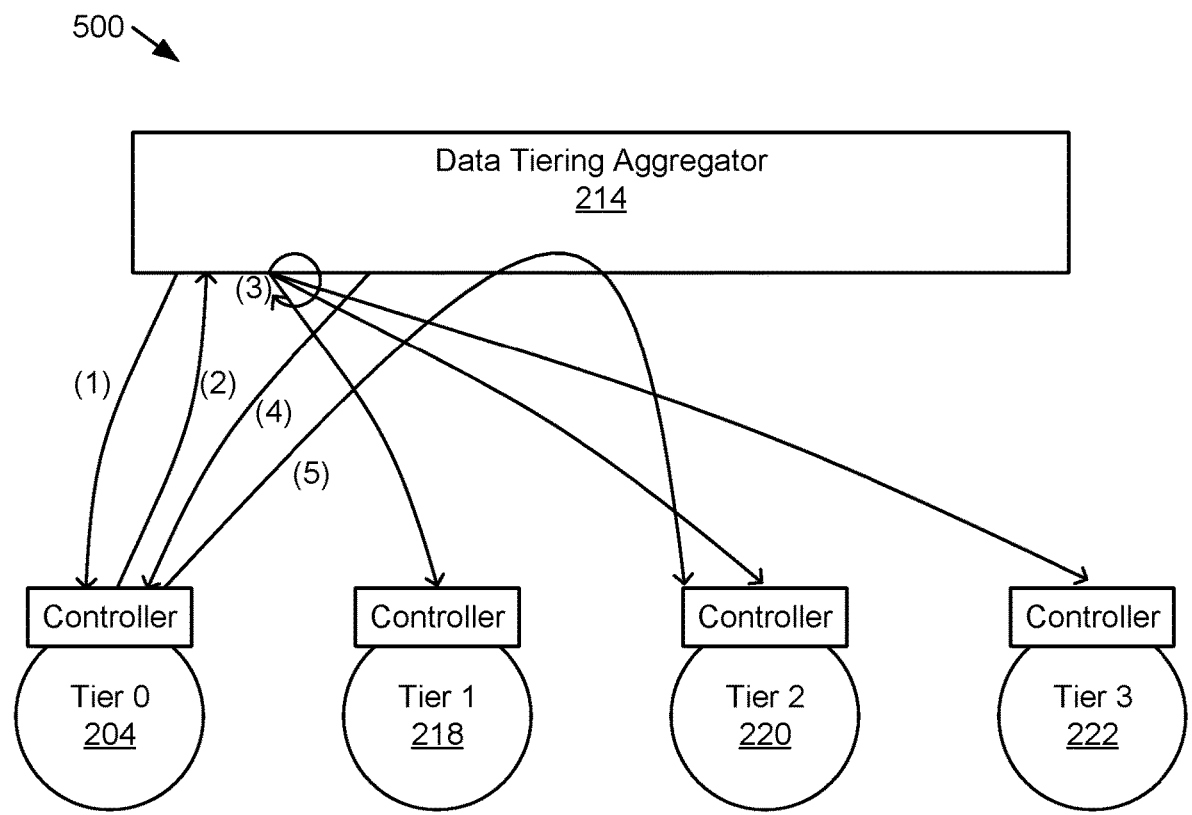
FIG. 5 is a schematic flow chart diagram illustrating the embodiment of FIG. 4 demonstrating an example of memory management.

FIG. 5 is a schematic flow chart diagram illustrating the embodiment of the apparatus 400 of FIG. 4 demonstrating an example of memory management. Note that each tier (e.g. tier 0 storage 204, tier 1 storage 218, tier 2 storage 220 and tier 3 storage 222) includes a memory controller that is configured to control where data is stored in the tier and facilitates access to the data.

The data tiering aggregator 214 queries (step 1) tier 0 storage 204 for data to be transferred to a different tier. The memory controller 206 of the tier 0 storage 204 is configured to respond (step 2) with data (quantity, size, etc.). The data tiering aggregator 214 then uses logic of a data tiering scheme (step 3) to determine which tier is appropriate for the data (see lines to each tier). In the example, the data tiering aggregator 214 determines that tier 2 storage 220 is an appropriate location and provides (step 4) the destination tier (e.g. tier 2 storage 220) to the memory controller 206 of the tier 0 storage 204. The memory controller 206 of the tier 0 storage 204 then moves (step 5) the data through the high-speed fabric controller 212 to tier 2 storage 220. Note that none of the steps involved the processor 104. Thus, the direct connection 228 between the tier 0 storage 204 of a processor 104, 302a-n and the high-speed fabric controller 212/data tiering aggregator 214 allows movement of data without burdening the processors 104, 302a-n.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a high-speed fabric controller;
   a memory controller connected between a high-speed memory and a processor, the memory controller configured to control processor access to the high-speed memory over a memory bus between the processor and the high-speed memory;
   a data connection between the processor and the high-speed fabric controller;
   a high-speed data connection between the memory controller and the high-speed fabric controller; and
   a data connection between a tier of persistent data storage and the high-speed fabric controller,
   wherein the high-speed data connection between the memory controller and the high-speed fabric controller is separate from of the connection between the processor and the high-speed fabric controller, and
   wherein the high-speed fabric controller is configured to control data transfers between the tier of persistent data storage and the high-speed memory over the high-speed data connection and independent of the processor.

2. The apparatus of claim 1, wherein the high-speed fabric controller is configured to transfer data between the high-speed memory and the tier of persistent data storage without the data passing through the processor.

3. The apparatus of claim 1, wherein the high-speed fabric controller is configured to control data transfers between the tier of persistent data storage over and the high-speed memory over the high-speed data connection without involvement of the processor.

4. The apparatus of claim 1, wherein the high-speed data connection is a first high-speed data connection, the processor is a first processor, the memory controller is a first memory controller and the high-speed memory is a first high-speed memory and further comprising a second high-speed data connection between the high-speed fabric controller and a second memory controller connected between to a second high-speed memory and a second processor, the second memory controller configured to control second processor access to the second high-speed memory over a memory bus between the second processor and the second high-speed memory and wherein the high-speed fabric controller is configured to control data transfers between one or more of the first high-speed memory, the tier of persistent data storage and the second high-speed memory independent of the first processor and the second processor.

5. The apparatus of claim 4, wherein the high-speed fabric controller is configured to manage spare data capacity of the first high-speed memory and the second high-speed memory to share spare data capacity so that spare data capacity of the first high-speed memory and the second high-speed memory is less than spare data capacities of not sharing spare data capacity.

6. The apparatus of claim 1, wherein the tier of persistent data storage is a first tier of persistent data storage and further comprising one or more additional tiers of persistent data storage and wherein the high-speed fabric controller further comprises a data tiering aggregator that is configured to control data tiering between the high-speed memory, the first tier of persistent data storage and the one or more additional tiers of persistent data storage.

7. The apparatus of claim 6, wherein the data tiering aggregator is configured to manage data tiering independent of caching instructions from the processor.

8. The apparatus of claim 6, wherein the processor comprises a pre-fetch queue and requests data caching through the pre-fetch queue and the data tiering aggregator accesses the pre-fetch queue to fulfil caching requests from the processor.

9. The apparatus of claim 6, wherein the first tier of persistent data storage and the one or more additional tiers of persistent data storage are connected to the high-speed fabric controller over a high-speed data connection.

10. The apparatus of claim 6, wherein the high-speed memory and each tier of persistent data storage comprise a different data storage speed and the data tiering aggregator is configured to manage data tiering based on data storage speeds of the high-speed memory and each tier of persistent data storage.

11. The apparatus of claim 6, wherein the data tiering aggregator is configured to present data to the processor as a single data source without respect to a data tier of data storage controlled by the high-speed fabric controller.

12. The apparatus of claim 1, wherein data connection between the memory controller and the processor comprises a parallel memory interface.

13. The apparatus of claim 1, wherein the memory controller is configured to respond to commands from the processor and the high-speed fabric controller.

14. An apparatus comprising:
   a high-speed fabric controller comprising a data tiering aggregator;
   a memory controller connected between a high-speed memory and a processor, the memory controller configured to control processor access to the high-speed memory over a memory bus between the processor and the high-speed memory;
   a high-speed data connection between the memory controller and the high-speed fabric controller;
   a data connection between a first tier of persistent data storage and the high-speed fabric controller; and
   a data connection between each of one or more additional tiers of persistent data storage and the high-speed fabric controller;
   a data connection between the processor and the high-speed fabric controller,
   wherein the data tiering aggregator is configured to control data tiering between the high-speed memory, the first tier of persistent data storage and the one or more additional tiers of persistent data storage, and
   wherein the high-speed fabric controller is configured to control data transfers between the first tier of persistent data storage and the high-speed memory independent of the processor without the data passing through the processor.

15. The apparatus of claim 14, wherein the data tiering aggregator is configured to manage data tiering independent of caching instructions from the processor.

16. The apparatus of claim 14, wherein the high-speed memory and each tier of persistent data storage comprise a different data storage speed and the data tiering aggregator is configured to manage data tiering based on the data storage speeds of the high-speed memory and each tier of persistent data storage.

17. The apparatus of claim 14, wherein the data tiering aggregator is configured to present data to the processor as a single data source without respect to a data tier of data storage controlled by the high-speed fabric controller.

18. A system comprising:
a processor;
a high-speed memory connected to the processor over a memory bus;
a high-speed fabric controller;
a memory controller connected between the high-speed memory and the processor, the memory controller configured to control processor access to the high-speed memory over the memory bus;
a data connection between the processor and the high-speed fabric controller;
a high-speed data connection between the memory controller and the high-speed fabric controller; and
a data connection between each of one or more tiers of persistent data storage and the high-speed fabric controller,
wherein the high-speed data connection between the memory controller and the high-speed fabric controller is separate from the connection between the processor and the high-speed fabric controller, and
wherein the high-speed fabric controller is configured to control data transfers between the one or more tiers of persistent data storage and the high-speed memory independent of the processor.

19. The system of claim 18, wherein the high-speed data connection is a first high-speed data connection, the processor is a first processor, the memory controller is a first memory controller and the high-speed memory is a first high-speed memory, the system further comprising a second processor, a second high-speed memory, a second high-speed data connection between the high-speed fabric controller and a second memory controller connected between the second high-speed memory and the second processor, the second memory controller configured to control second processor access to the second high-speed memory over a parallel bus between the second processor and the second high-speed memory and wherein the high-speed fabric controller is configured to control data transfers between one or more of the first high-speed memory, the one or more tiers of persistent data storage and the second high-speed memory independent of the first processor and the second processor.

* * * * *